US011625446B2

(12) United States Patent
Rezaeian et al.

(10) Patent No.: US 11,625,446 B2
(45) Date of Patent: Apr. 11, 2023

(54) COMPOSING HUMAN-READABLE EXPLANATIONS FOR USER NAVIGATIONAL RECOMMENDATIONS

(71) Applicant: Oracle International Corporation, Redwood Shores, CA (US)

(72) Inventors: Amir Hossein Rezaeian, San Mateo, CA (US); Alberto Polleri, London (GB)

(73) Assignee: Oracle International Corporation, Redwood Shores, CA (US)

( * ) Notice: Subject to any disclaimer, the term of this patent is extended or adjusted under 35 U.S.C. 154(b) by 158 days.

(21) Appl. No.: 17/302,429

(22) Filed: May 3, 2021

(65) Prior Publication Data

US 2022/0350846 A1 Nov. 3, 2022

(51) Int. Cl.
*G06F 16/00* (2019.01)
*G06F 16/954* (2019.01)
(Continued)

(52) U.S. Cl.
CPC ............ *G06F 16/954* (2019.01); *G06F 17/18* (2013.01); *G06N 20/00* (2019.01)

(58) Field of Classification Search
CPC ....... G06F 16/954; G06F 17/18; G06N 20/00; G06N 3/0481; G06N 5/045; G06N 3/0454; G06N 3/08; G06N 3/0445
See application file for complete search history.

(56) References Cited

U.S. PATENT DOCUMENTS 10,909,442 B1 * 2/2021 Szarvas .................... G06N 3/08
11,435,873 B1 * 9/2022 Sharma ................. G06F 3/0482
(Continued)

FOREIGN PATENT DOCUMENTS

WO  2021/004228 A1  1/2021
WO  2021/023249 A1  2/2021

OTHER PUBLICATIONS

Li et al., "Generate Neural Template Explanations for Recommendation" Proceedings of the 29th ACM International Conference on Information & Knowledge Management, ACMPUB27, New York, NY, USA, Oct. 19, 2020, 10 pages.
(Continued)

*Primary Examiner* — Noosha Arjomandi
(74) *Attorney, Agent, or Firm* — Invoke

(57) ABSTRACT

Techniques for generating human-readable explanations (also referred to herein as "reasons") for navigational recommendations are disclosed. Composing a human-readable explanation includes individually selecting words or phrases that are then analyzed, combined, rearranged, modified, or removed to generate the human-readable explanation for a navigational recommendation. A decoder trains a machine learning model to generate the human-readable reasons for the navigational recommendations based on (1) historical recommendation vectors, and (2) historical human-readable reasons associated with the recommendation vectors. The system generates a dictionary of human-readable reasons for recommendations, with each entry of the dictionary including: (1) a recommendation identifier (ID) associated with a recommended navigational target, (2) a reason identifier (ID) associated with a particular reason for the recommendation, and (3) a human-readable reason associated with the reason ID.

19 Claims, 4 Drawing Sheets

(51) Int. Cl.
*G06N 20/00* (2019.01)
*G06F 17/18* (2006.01)

(56) References Cited

U.S. PATENT DOCUMENTS

| | | | | |
|---|---|---|---|---|
| 2003/0182249 | A1* | 9/2003 | Buczak | H04N 21/454 |
| | | | | 348/E7.054 |
| 2005/0096950 | A1* | 5/2005 | Caplan | G06Q 10/06395 |
| | | | | 705/7.41 |
| 2008/0189232 | A1* | 8/2008 | Dunning | G06F 16/907 |
| | | | | 706/45 |
| 2012/0150626 | A1* | 6/2012 | Zhang | G06Q 30/0243 |
| | | | | 705/14.42 |
| 2012/0172025 | A1* | 7/2012 | Hamalainen | H04W 4/50 |
| | | | | 455/418 |
| 2012/0254099 | A1* | 10/2012 | Flinn | G06F 40/253 |
| | | | | 706/52 |
| 2012/0278268 | A1* | 11/2012 | Hamalainen | G06F 16/435 |
| | | | | 706/46 |
| 2016/0203221 | A1* | 7/2016 | Rao | G06Q 50/01 |
| | | | | 707/707 |
| 2016/0209228 | A1* | 7/2016 | Golding | G01C 21/3484 |
| 2016/0314114 | A1* | 10/2016 | Barbetta | G06F 40/253 |
| 2019/0114668 | A1* | 4/2019 | Zhuo | G06F 16/00 |
| 2019/0249225 | A1* | 8/2019 | Kim | C12Q 1/6806 |
| 2019/0354805 | A1* | 11/2019 | Hind | G06V 10/764 |
| 2020/0005196 | A1* | 1/2020 | Cai | G06F 16/9535 |
| 2020/0134461 | A1* | 4/2020 | Chai | G06N 3/0635 |
| 2020/0184278 | A1* | 6/2020 | Zadeh | G06K 9/6264 |
| 2020/0394534 | A1* | 12/2020 | Krishnan | G06Q 10/06393 |
| 2021/0142196 | A1* | 5/2021 | R | G06F 16/258 |
| 2021/0358319 | A1* | 11/2021 | Modde | G09B 5/06 |
| 2021/0390609 | A1* | 12/2021 | Trinh | G06N 3/08 |
| 2022/0093088 | A1* | 3/2022 | Rangarajan Sridhar | |
| | | | | G06F 16/338 |
| 2022/0113996 | A1* | 4/2022 | Brdiczka | G06T 11/60 |
| 2022/0147845 | A1 | 5/2022 | Fu et al. | |
| 2022/0207352 | A1* | 6/2022 | Barr | H04L 63/1416 |
| 2022/0350846 | A1* | 11/2022 | Rezaeian | G06N 3/08 |
| 2022/0366295 | A1* | 11/2022 | Lamba | G06F 16/24575 |

OTHER PUBLICATIONS

Li et al., "Personalized Transformer for Explainable Recommendation", arxiv.org, Cornell University Library, 201. Olin Library Cornell University Ithaca, NY 14853, Jun. 5, 2021, 11 Pages.

* cited by examiner

COMPOSING HUMAN-READABLE EXPLANATIONS FOR USER NAVIGATIONAL RECOMMENDATIONS

TECHNICAL FIELD

The present disclosure relates to composing human-readable explanations for user navigational recommendations. In particular, the present disclosure relates to using a product of a neural network, that generates a user navigational recommendation, for a composing human-readable explanation for the user navigational recommendations.

BACKGROUND

Various user interface applications provide recommendations to users that the users can select to navigate to a service. To assist the user in making a selection based on the navigational recommendations, the application may indicate the reason for the navigational recommendations. For example, the application may indicate the user has made a similar selection in the recent past or other similar users have made the recommended selection. Typically, applications include only a few categories of reasons that can be provided to a user as an explanation for a recommendation. A limited, static set of reasons are typically programmed by a developer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
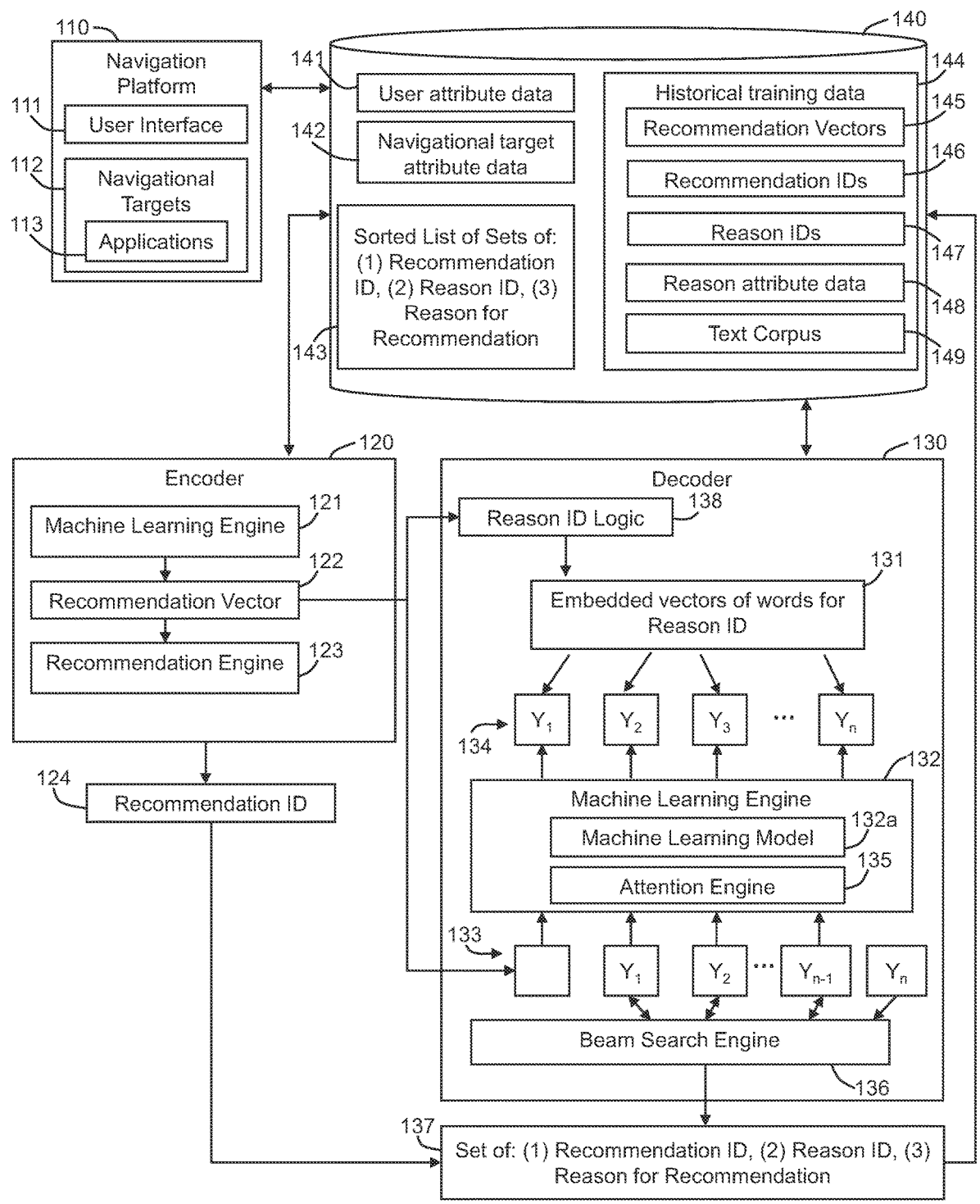
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. COMPOSING HUMAN-READABLE REASONS FOR USER INTERFACE NAVIGATIONAL RECOMMENDATIONS
4. TRAINING SEQUENCE-TO-SEQUENCE MACHINE LEARNING MODEL
5. COMPUTER NETWORKS AND CLOUD NETWORKS
6. MISCELLANEOUS; EXTENSIONS
7. HARDWARE OVERVIEW

1. General Overview

A navigation platform provides users access to multiple different applications and services. Each application and service may include many different functions. Each of these functions is a potential navigational target that a user may navigate to within the navigation platform to perform the function.

One or more embodiments compose human-readable explanations (also referred to herein as "reasons") for navigational recommendations. Composing a human-readable explanation includes individually selecting words or phrases that are then analyzed, combined, rearranged, modified, or removed to generate the human-readable explanation for a navigational recommendation.

The system generates a navigational recommendation by applying a trained neural network to a set of conditions. The set of conditions may include, for example, prior user activity, a current position in the navigation platform, a current day and time. In applying the trained neural network, the system generates an initial vector that encodes the set of conditions. The initial vector (also referred to herein as a "layer") is recursively processed to sequentially generate additional vectors (additional "layers") until a final vector, that may be mapped to the navigational recommendation, is generated. In an embodiment, one of the vectors generated by the application of the neural network, for generating the navigational recommendation, is extracted for use in composing the human-readable explanation for the navigational recommendation. The vector, generated by the neural network and extracted for use in composing the human-readable explanation, may be referred to herein as a "recommendation vector".

In one embodiment, a decoder trains a machine learning model to generate the human-readable reasons for the navigational recommendations based on (1) historical recommendation vectors, and (2) historical human-readable reasons associated with the recommendation vectors. The system generates a dictionary of human-readable reasons for recommendations, with each entry of the dictionary including: (1) a recommendation identifier (ID) associated with a recommended navigational target, (2) a reason identifier (ID) associated with a particular reason for the recommendation, and (3) a human-readable reason associated with the reason ID. In one or more embodiments, the machine learning model that generates the human-readable reasons for the navigational recommendations is a sequence-to-sequence (seq2seq) machine learning model.

In one or more embodiments, the machine learning model generates the human-readable reasons for navigational recommendations by receiving the recommendation vector as an input and generating an initial word as an output. The recommendation vector and the initial word are provided to the machine learning model as inputs to generate a next word in the human-readable reasons for the navigational recommendation. The process is repeated until each word in the human-readable reasons for the navigational recommendation is generated. The words generated by the machine learning model may be represented as embedded vectors that are associated with words or phrases. The decoder identifies the words and phrases associated with the embedded vectors to generate the human-readable reasons for the navigational recommendations.

Subsequent to being trained, the machine learning model may generate any number of human-readable reasons for user navigational recommendations that are customized to a particular user. For example, two users may be provided with different reasons for a same user interface navigational recommendation. In addition, the same user may be provided with different reasons for a recommendation at different times. Since the human-readable reasons are generated by the machine learning model, the number of human-readable reasons is not limited to reasons entered by operators into the system. In addition, operators are not required to enter particular rules to display particular human-readable reasons for particular recommendations. Instead, the machine learning model generates a customized human-readable reason for a customized recommendation based on sets of user attributes and sets of navigational target attributes.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a navigation platform 110, an encoder 120, a decoder 130, and a data repository 110.

The navigation platform 110 may be a program or set of programs providing access to a suite of applications and services. The navigation platform 110 includes a user interface 111 and navigational targets 112.

In one or more embodiments, user interface 111 refers to hardware and/or software configured to facilitate communications between a user and the navigation platform 110. Interface 111 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 111 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 111 is specified in one or more other languages, such as Java, C, or C++.

Navigational targets 112 include applications, documents, and executable files. Examples of navigational targets include: a program to review an invoice in an accounting application; a program to store, edit, and display an expense report in an accounting application; a program to store, edit, and display customer and lead contact information in a customer acquisition application; a program to retrieve sales data, and to generate and display a sales forecast in a business operations application; a program to store, edit, and display workflow information of projects in a project management application; a program to store, edit, and display employee information in a human resources application; and a program to retrieve and display compliance data for compliance with government regulations. While the navigational targets, above, are provided by way of example, these are not an exhaustive list of possible navigational targets. Embodiments encompass any program and any application to which a user may navigate to retrieve information and/or perform a function in a navigation platform. In one or more embodiments, the navigation platform 110 generates a user interface element in a GUI of the user interface 111 to allow a user to select the user interface element to access a navigational target 112.

Each navigational target 112 is associated with an application 113. Many different navigational targets may belong to the same application. For example, an accounting application includes navigational targets corresponding to different functions in the accounting application, including: generating expense reports; generating financial forecasts; generating payroll information; etc. As another example, a human resources application includes navigational targets that include: view employee list; view and edit employee information; request leave; generate employee performance reports; view organization; etc. Each navigational target 112 includes navigational target attributes.

In one or more embodiments, the navigation platform 110 displays in the GUI of the user interface 111 a set of user interface elements to allow a user to navigate to a corresponding set of navigational targets 112. The displayed user interface elements may belong to navigational targets 112 associated with different applications 113. In addition, or in the alternative, the displayed user interface elements may belong to different documents or executable files within the same application.

The encoder 120 obtains user attribute data 141 and navigational target attribute data 142 from the data repository 140. Alternatively, the user attribute data 141 and navigational target attribute data 142 may be obtained from the navigation platform 110. For example, a user may log in to the navigation platform 110 and generate a user profile including user attribute data. User attribute data 141 include data about particular users. Examples of user attribute data 141 include: job name, role, assignment, location, and business unit. While the user attributes, above, are provided by way of example, these are not an exhaustive list of possible user attributes. Embodiments encompass any information that may be associated with a user to identify attributes of the user. Navigational target attribute data include data about the navigational target. Examples of navigational target attributes include: application stripe, product family, view ID, menu ID, taskflow ID, WebAppName, contextualAreaWidth, RecentItemsID, ObjectCode, CreationDate, LastUpdateLogin, LastUpdateDate, EnterpriseID, ParentID, SourceFile. While the navigational target attributes, above, are provided by way of example, these are not an exhaustive list of possible navigational target attributes. Embodiments encompass any information that may be associated with a navigational target to identify attributes of the navigational target.

In one or more embodiments, the data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as the navigation platform 110, the encoder 120, or the decoder 130. Alternatively, or additionally, a data repository 140 may be implemented or executed on a computing system separate from the navigation platform 110, the encoder 120, or the decoder 130. A data repository 140 may be communicatively coupled to the navigation platform 110, the encoder 120, or the decoder 130 via a direct connection or via a network.

Information describing user attribute data 141, navigational target attribute data 142, historical training data 114, and sorted lists 117 may be implemented across any of components within the system 100. However, this information is illustrated within the data repository 140 for purposes of clarity and explanation.

The encoder 120 generates an input vector based on user attribute data 141 and navigational target attribute data 142. The encoder may convert the user attribute data 141 and navigational target attribute data 142 to numerical values and vector values. The encoder may concatenate the converted user attribute data 141 and navigational target attribute data 142 to generate the input vector. The encoder 120 provides the input vector to the machine learning engine 121 to generate a recommendation vector 122. The machine learning engine 121 may include a trained machine learning model that has been trained to receive the input vector and generate one or more recommended navigational targets based on the input vector. In one embodiment, the machine learning model is a contextual multi-armed bandit-type machine learning model.

In one or more embodiments, the encoder 120 provides the recommendation vector 122 to a recommendation engine 123 to generate the one or more recommended navigational targets based on the input vector. The encoder 120 may convert the recommendation vector 122 to a probability distribution using a SoftMax layer prior to providing the recommendation vector 122 to the recommendation engine 123. The recommendation engine 123 identifies, based on the information in the recommendation vector 122, one or more recommended navigational targets for the user. Each navigational target is represented by a unique recommendation ID 124. The recommendation engine 123 may generate an ordered list of recommendation IDs 124 for a corresponding list of recommendation vectors 122.

The encoder 120 also provides the recommendation vector 122 to the decoder 130 to train another machine learning model to generate human-readable reasons for user interface navigational recommendations. The recommendation vector 122 is a multi-dimensional vector having vector values, generated by the machine learning engine 121, based on relationships between user attribute data, navigational target attribute data, a recommended user interface navigation, and a reason for the recommendation. The recommendation vector 122 includes contextual information of a particular recommendation associated with a particular reason for the recommendation. Therefore, the recommendation vector 122 includes contextual information of a sequence of words associated with the particular navigational recommendation. The recommendation vector 122, including the contextual information of the sequence of words, is provided to a machine learning engine 132 that trains a machine learning model 132a to learn from the contextual information of the sequence of words included in the recommendation vector to sequentially generate a sequence of output vectors 134 corresponding to a human-readable reason for the navigational recommendation.

In one or more embodiments, the machine learning model 132a is a bi-directional sequence-to-sequence (seq2seq) machine learning model 132a, where an input sequence is encoded within the recommendation vector 122. In one or more embodiments, the machine learning model 132a includes a long short-term memory (LTSM) type model, a gate recurrent unit (GRU) type model, or an extended recurrent neural network (RNN) type model.

The machine learning engine 132 trains the machine learning model 132a to generate a human-readable reason for a recommendation based on (1) the recommendation vector 122, and (2) embedded vectors 131 of words for a reason ID associated with the recommendation vector 122. The decoder 130 includes reason ID logic 138 that identifies a reason for the recommendation included in the contextual information of the recommendation vector 122. The reason ID logic associates the reason with a reason ID, which is a unique identifier associated with the human-readable reason for the recommendation.

The recommendation vector 122 is provided as an input vector to the machine learning model 132a to generate a first output vector $Y_1$ of a sequence of output vectors 134. The first output vector $Y_1$ may be generated from among the set of embedded vectors 131 that represent the words for a particular reason ID. The first output vector $Y_1$ and the recommendation vector 122 are provided as an input vector to the machine learning model 132a to generate the next output vector $Y_2$ of the sequence of output vectors 134. Each of the output vectors 134 represents an embedded vector of a word in the sequence of words 134 that make up the human-readable reason for a recommendation. The machine learning model 132a repeats the process of providing a previously-generated output vector and the recommendation vector 122 as an input vector to generate a next output vector in the sequence 134 until each output vector $Y_1$-$Y_n$ has been generated. The decoder 130 then generates the human-readable reason for the recommendation using the sequence 134 of output vectors $Y_1$-$Y_n$.

The machine learning engine 132 trains the machine learning model 132a based on historical training data 144 stored in the data repository 140. The historical training data 144 includes: (1) historical recommendation vectors 145, (2) recommendation IDs 146 associated with the historical recommendation vectors 145, (3) reason IDs associated with the historical recommendation vectors 145, (4) reason attribute data 148, and (5) a text corpus 149. The text corpus 116 may include words that have previously been used to generate human-readable reasons for navigational recommendations, as well as words from any other sources, such as a dictionary. For example, the historical training data 144 may include one thousand (1,000) reason IDs 147 and an associated one thousand (1,000) sequences of words corresponding to the respective reason IDs 147. The decoder 130 converts the sequence of words associated with a particular reason ID 147 for a reason included in a corresponding historical recommendation vector 145 into an embedded vector 131 of words.

For a predetermined subset of the historical training data 144, the machine learning model 132a generates a sequence of output vectors 134 corresponding to a human-readable sequence of words for a historical reason ID 147 associated with a historical recommendation vector 145. The machine learning engine 132 may compare the generated human-readable sequences of words with the sequences of words associated with the historical reason IDs 147 to train the machine learning model 132a.

In one or more embodiments, the machine learning engine 132 includes an attention engine 135. For each input vector, other than the recommendation vector 122, in the sequence of input vectors 133, the attention engine 135 applies weights to vector values of the recommendation vector 122 to focus the machine learning model 132a on words in the reason for the recommendation. In one embodiment, the attention engine performs a dot-product operation on (1) the set of vectors $Y_1$-$Y_n$ representing the words of a particular reason ID, and (2) the recommendation vector 122, to generate a scalar value. The attention engine 135 generates an attention distribution based on the scalar values for the vectors $Y_1$-$Y_n$. The attention engine 135 converts the attention distribution to a vector and applies the vector to the recommendation vector 122. Consequently, the machine learning model 132a applies a greater weight to a particular word, represented by a particular embedded vector $Y_1$-$Y_n$ among the embedded vectors 131 representing the words associated with the reason ID.

In one or more embodiments, the decoder 130 includes a beam search engine 136 to improve the efficiency of the generation of output vectors $Y_2$-$Y_n$ by the machine learning model 132a. For each input vector, other than the recommendation vector 122, in the sequence 133 of input vectors $Y_1$-$Y_n$, the beam search engine 136 generates k sets of words identified as having the highest probability of being the next words in the reason for the recommendation. For example, the beam search engine 136 may identify four sets of words, each set made up of a sequence of three words, having the highest probability of being the next three words in the sequence of words corresponding to the sequence 134 of output vectors $Y_2$-$Y_n$. The beam search engine 136 provides the k sets of words to the machine learning model 132a to influence the machine learning model 132a towards generating output vectors $Y_2$-$Y_n$ based on the sets of words having the highest probability of being the next words in the sequence. For example, the machine learning engine 132 may coefficient values for neurons within a neural network to influence the neural network to generate an output vector corresponding to a particular word or set of words.

Once trained, the machine learning model 132a generates, for a given input recommendation vector 122, a set 137 of (1) a recommendation ID, corresponding to a recommendation for a navigation target for a user, (2) a reason ID, corresponding to a particular reason for providing the navigational recommendation, and (3) a human-readable reason for the recommendation, including a sequence of words describing the reason for providing the recommendation. In one or more embodiments, the words of the human-readable reason may be stored as vector values $Y_1$-$Y_n$ that are converted into words by the navigation platform 110.

The system 100 may generate a sorted list 143 of recommendation IDs, reason IDs, and human-readable reasons for the navigational recommendations. When a user logs in to the user interface 111 or when a new user profile is entered by the navigation platform 110, the encoder may generate a recommendation vector 122 based on the user attribute data 141 of the user. In addition, the recommendation engine 123 may generate one or more recommendation IDs 124 based on the recommendation vector 122. The navigation platform 110 may obtain human-readable reasons for the navigational recommendations from the sorted list 117, if a corresponding reason ID exists in the sorted list. Alternatively, or in addition, the decoder 130 may generate a new reason ID and a new human-readable reason for a recommendation based on the new reason ID. The navigation platform 110 displays, in the user interface 111, user interface elements corresponding to the recommended navigational targets and human-readable reasons for the navigational recommendations.

In one or more embodiments, encoder 120, decoder 130, and navigation platform 110 refers to hardware and/or software configured to perform operations described herein for composing human-readable reasons for user interface navigational recommendations. Examples of operations for composing human-readable reasons for user interface navigational recommendations are described below with reference to FIG. 2.

In an embodiment, one or more of the encoder 120, the decoder 130, and the navigation platform 110 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

3. Composing Human-Readable Reasons for Navigational Target Recommendations

Figure 2:
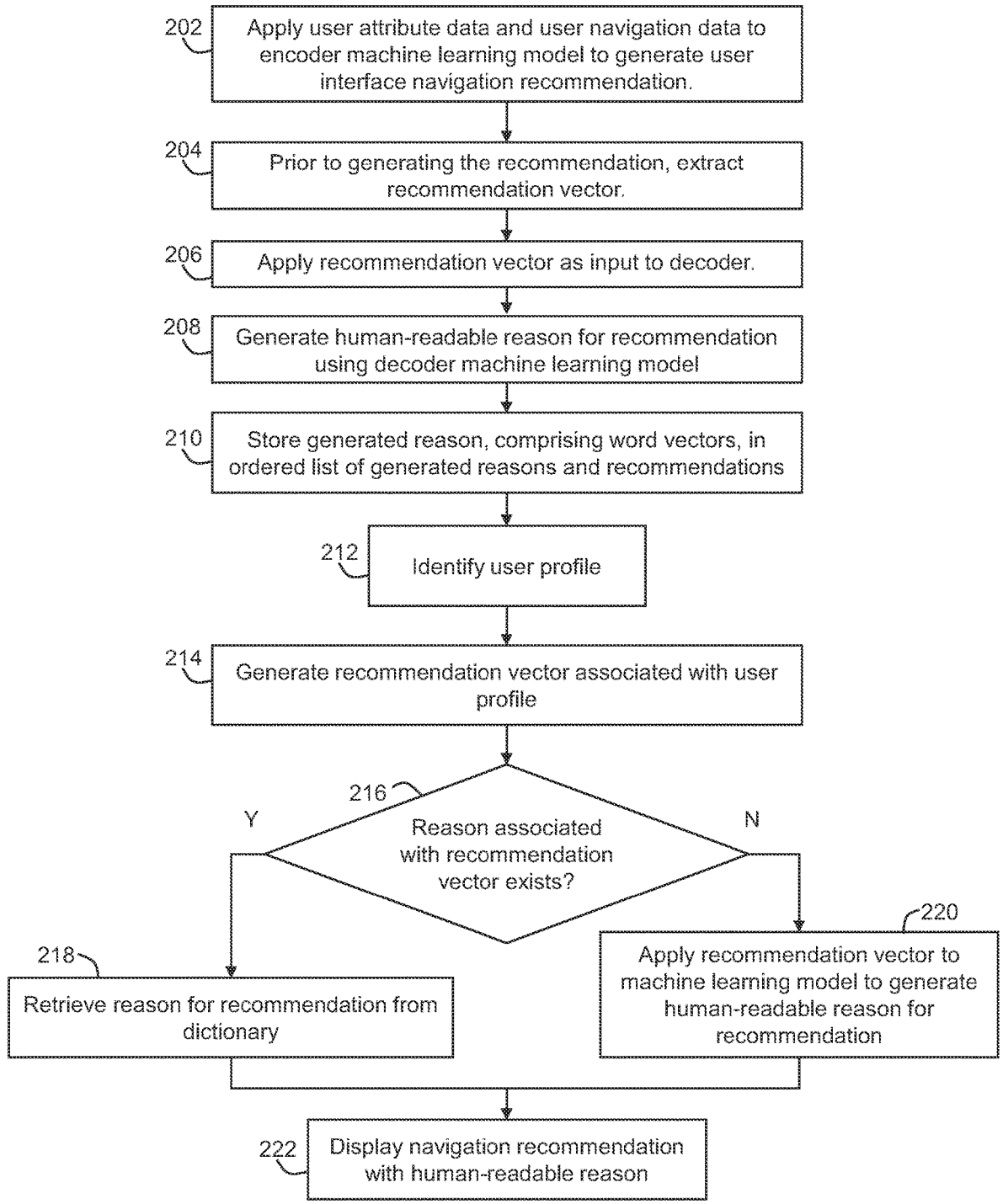
FIG. 2 illustrates an example set of operations for generating a human-readable reason for a user interface navigational recommendation in accordance with one or more embodiments.

FIG. 2 illustrates an example set of operations for composing human-readable reasons for user interface navigational recommendations in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In one or more embodiments, an encoder generates a user interface navigational recommendation by providing a vector, including user attribute data and navigation attribute data, to a trained machine learning model (Operation 202). For example, the encoder may convert user attribute values and navigation attribute data values to numerical values and vector values. The encoder may generate an input vector for the trained model based on the converted user attribute values and navigation attribute data values. In one example, the trained machine learning model is a contextual multi-armed bandit-type machine learning model.

Prior to generating the user interface navigational recommendation, the encoder extracts a recommendation vector from the model (Operation 204). The recommendation vector includes contextual information of a recommended user interface navigation and a corresponding reason for the recommendation. In one embodiment, the encoder extracts the recommendation vector prior to converting the recommendation vector into a probability distribution with a SoftMax layer. The encoder may then generate a navigational recommendation, and associate the recommendation with a recommendation ID, using the probability distribution. The recommendation vector is a hidden layer within the machine learning model that is generated prior to generating a user interface navigational recommendation and associated recommendation ID.

The encoder supplies the recommendation vector to a decoder (Operation 206). The decoder identifies a reason ID associated with the recommendation vector. The reason ID corresponds to a human-readable sequence of words that give a reason for a particular navigational recommendation. The decoder generates a set of embedded vectors corresponding to the words associated with the reason ID.

The decoder generates a human-readable reason for a recommendation in the recommendation vector using machine-learning model (Operation 208). In one embodiment, the machine learning model is a bi-directional deep-learning sequence-to-sequence model. For example, the machine learning model may be a long short-term memory (LTSM) type model, a gate recurrent unit (GRU) type model, or an extended recurrent neural network (RNN) type model. The machine learning model may receive as an input sequence the contextual information in the recommendation vector and may generate as an output sequence a series of embedded vectors representing words. The sequence of words describes the reason for the user interface navigational recommendations associated with the recommendation vector. The decoder generates the human-readable reason by providing, as input vectors to the machine-learning model, the recommendation vector and one or more previously-generated output vectors. In other words, the machine-learning model generates an initial output vector based on the recommendation vector. The machine-learning model generates each subsequent output vector based on (1) the recommendation vector and (2) at least one previously-generated output vector. In one or more embodiments, the embedded vectors representing words of a reason for a navigational recommendation define a set of vectors from among which the output vectors are generated. For example, the machine-learning engine may identify, from among the embedded vectors, the embedded vector having the highest probability of corresponding to the input vector.

The decoder stores the generated human-readable reason for a recommendation together with a reason ID and a recommendation ID (Operation 210). The decoder may generate an ordered list of reasons for user navigational recommendations in which each entry includes (1) a recommendation ID associated with a recommended navigational target, (2) a reason ID associated with the recommended navigational target, and (3) a human-readable reason associated with the reason ID.

Prior to receiving the recommendation vector from the encoder, the decoder trains the machine learning model. The model is trained based on (1) historical recommendation vectors, and (2) embedded vectors representing words of a reason associated with a reason ID associated with the historical recommendation vectors.

Subsequent to training the machine learning model, the system identifies a user profile (212). The user profile may be a stored user profile, a newly-generated user profile, a user profile of a user logging into the system, or a user profile generated by any other means. The user profile includes attribute information about the user. For example, the system may generate sets of navigational recommendations and human-readable reasons for the navigational recommendations for any users that are registered to use the system to access applications or services, without requiring the users to be logged into the system. In addition, or in the alternative, the system may detect a user login and may generate sets of navigational recommendations and human-readable reasons for the navigational recommendations based on detecting the user login. In another example, the system may generate sets of navigational recommendations and human-readable reasons for the navigational recommendations based on user navigation to a particular graphical user interface. Embodiments encompass the system generating sets of navigational recommendations and human-readable reasons for the navigational recommendations based on any predetermined event or trigger.

The encoder generates a recommendation vector using the user attribute information in the user profile and any navigation attribute information associated with the user (Operation 214). The encoder may generate the recommendation vector using the trained contextual multi-armed bandit-type machine learning model, for example.

The system identifies a recommendation ID and a reason ID associated with the recommendation vector. For example, the system may run the recommendation vector through a SoftMax layer to generate a probability distribution. The system may generate a recommendation ID based on the probability distribution. A decoder may identify a reason ID associated with the recommendation vector. The system determines whether a human-readable reason associated with the recommendation ID and the reason ID already exists (Operation 216). In particular, the system may refer to a dictionary storing sets of: (1) a recommendation ID, (2) a reason ID, and (3) a human-readable reason associated with the recommendation, to determine whether the human-readable reason already exists. If a human-readable reason associated with the recommendation ID and the reason ID was previously generated and stored, the system retrieves the human-readable reason from the dictionary storing the human-readable reasons for the navigational recommendations (Operation 218).

If the system determines that a human-readable reason has not yet been generated for the recommendation ID and the reason ID, the encoder provides the recommendation vector to the trained machine learning model of the decoder (Operation 220). The trained model sequentially generates the words for the human-readable reason for the recommendation. The system may store the set of recommendation ID, reason ID, and human-readable reason associated with the recommendation in the dictionary of previously-generated human-readable reasons for recommendations.

The system displays the navigational recommendation associated with the recommendation ID together with the human-readable reason for the recommendation associated with the reason ID (Operation 222). For example, a user may access a graphical user interface to navigate to one or more applications or services. The system may display the navigational recommendations and corresponding human-readable reasons for the navigations on the graphical user interface.

In one or more embodiments, the reason ID associated with a particular sequence of words may include information regarding a ranking for the particular sequence of words. For example, the system may determine that a particular navigational target is recommended based on three separate reason IDs, each associated with the different human-readable reason for the recommendation. The system may select only the highest-ranked recommendation to display the human-readable information for the recommendation. Alternatively, the system may select only a predetermined number of human-readable reasons for a recommendation, such as only two or fewer reasons for a recommendation.

In one or more embodiments, the recommendation vector may include information restricting the human-readable reasons that may be displayed for particular users having particular attributes. An organization may not want its general membership to know that certain classes of users are navigating to navigational targets associated with information that may be confidential or sensitive. For example, if a company is looking to acquire a competitor, a legal department may need to navigate to targets related to the competitor. The system may block users having a user attribute "division" with a value other than "legal" from generating recommendation vectors resulting in recommendation IDs associated with the competitor, or human-readable reasons identifying other employees as navigating to the navigational targets associated with the competitor. Similarly, the system may restrict human-readable reasons identifying searches of other users that reveal sensitive information, such as users accessing navigational targets related to salary, retirement, disability, personal leave, parental leave, or medical benefits. In one embodiment, the system may prevent the generation of human-readable reasons for particular recommendations. In another embodiment, the system may allow the generation of the human-readable reasons, but the system may assign the stored human-readable reasons with a ranking or designator preventing the use or display of the human-readable reasons with a recommendation. Accordingly, a system administrator may identify the types of recommendations that generate confidential or sensitive human-readable reasons.

4. Training Sequence-to-Sequence Machine Learning Model

Figure 3:
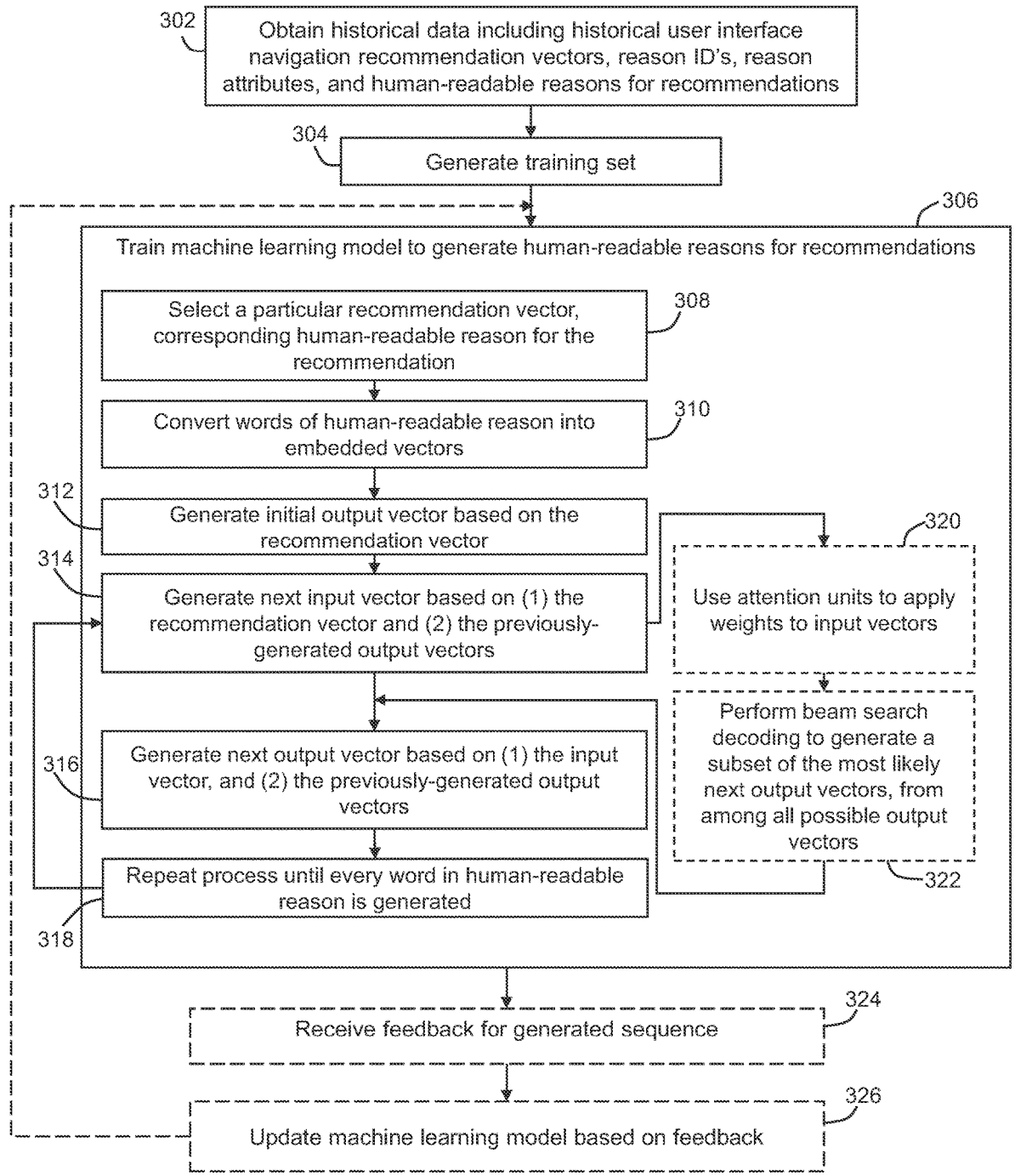
FIG. 3 illustrates an example set of operations for training a machine learning model to generate a human-readable reason for a user interface navigation in accordance with one or more embodiments.

FIG. 3 illustrates an example set of operations for training machine learning model to sequentially generate words for human-readable reasons for user interface navigational recommendations in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A machine learning engine obtains historical user navigation data (Operation 302). The user navigation data includes user interface recommendation vectors associated with users and user navigation, historical reason ID's associated with the navigational recommendations, and human-readable reasons associated with the reason ID's. For example, a navigation platform may give users access to many different applications and many different processes, documents, and functions within each application. Each process, document, and function that may be accessed by a user may be a separate navigational target. The recommendation vectors are generated by a trained machine learning engine and include contextual information of historical user navigation data, including information about how often each user accesses each process, document, and function in each application provided by the navigation platform.

The machine learning engine generates training sets of recommendation vectors, recommendation ID's, and corresponding human-readable reasons for recommendations (Operation 304). The training sets include particular user navigational recommendations, represented by recommendation IDs and associated human-readable reasons, represented by reason IDs.

The machine learning engine uses the training sets to train a machine learning model to generate human-readable reasons for user navigational recommendations (Operation 306). The machine learning engine selects a particular recommendation vector corresponding to a particular human-readable reason for the recommendation (Operation 308). The machine learning engine converts the words of the human-readable reason into embedded vectors (Operation 310). In one embodiment, the machine learning engine includes a pre-trained word-to-vector (word2vec) model having been trained with all the words in a text corpus including the words of all the human-readable reasons for all the user navigational recommendations in the historical data. The machine learning engine converts the words of the particular reason for the recommendation into the vectors generated with the word2vec model.

The machine learning engine inputs the recommendation vector into another machine learning model to generate an initial output vector (Operation 312). For example, the machine learning model may be a bi-directional sequence-to-sequence (seq2seq) machine learning model. The model may be a long short-term memory (LTSM) type model, a gate recurrent unit (GRU) type model, or an extended recurrent neural network (RNN) type model. In one embodiment, the initial output vector is selected from among the embedded vectors representing the words associated with the historical human-readable reason for the recommendation associated with the recommendation vector. In an alternative, the initial output vector may be selected from among a combined set of: (1) the words associated with the historical human-readable reason for the recommendation, and (2) a set of words identified as being related, in the word2vec model, to the words in the historical human-readable reason.

The machine learning engine takes the initial output vector and the recommendation vector and inputs the two vectors into the human-readable reason-generating model to generate the next word in the sequence of output vectors representing human-readable words of a reason for a recommendation (Operation 314). The machine learning engine takes the previously-generated output vector and the recommendation vector, and inputs the two vectors into the model to generate the next output vector (Operation 316).

In one embodiment, the machine learning engine includes an attention engine. The attention engine applies weights to vector values of the recommendation vector to focus the human-readable reason-generating machine learning model on a particular next word in the reason for the recommendation (Operation 320). In one embodiment, the attention engine performs a dot-product operation on (1) the embedded vectors representing the words associated with the historical human-readable reason for the recommendation, and (2) the recommendation vector associated with the recommendation, to generate a scalar value. The attention engine generates an attention distribution based on the scalar values for the embedded vectors. The attention engine converts the attention distribution to a vector and applies the vector to the recommendation vector. Consequently, the machine learning engine applies a greater weight to a particular word, represented by a particular embedded vector among the embedded vectors representing the words associated with the recommendation.

In one embodiment, the machine learning engine also includes a beam search engine. At each stage in which an output vector and the recommendation vector are applied as inputs to the human-readable reason-generating machine learning model, the beam search engine generates k sets of output vectors, corresponding to words in a reason for a recommendation, identified as having the highest probability of being the next output vector (Operation 322). For example, the beam search engine may identify four sets of output vectors, each set made up of a sequence of three output vectors, having the highest probability of being the next output vectors in the sequence of output vectors generated by the machine learning model. The beam search engine provides the k sets of output vectors to the machine learning engine to influence the machine learning model towards generating particular output vectors having the highest probability of being the next output vectors in the sequence.

The machine learning engine repeats the process of providing a previously-generated output vector together with the recommendation vector as inputs to the machine learning model to generate a next output vector until every word in the human-readable reason for a recommendation has been generated (Operation 318).

In one embodiment, the generated output vectors are converted into their corresponding sequence of words, and the sequence of words is output to a user. The user may provide feedback regarding the sequence of words (Operation 324). For example, the user may identify a word that does not make sense among the sequence of words, words that are out of order, or words that are either unnecessary in the sequence or missing from the sequence. In one or more embodiments, the machine learning engine may provide to the user one or more alternate words based on relationships identified between words by the word2vec model.

In one or more embodiments, the user may indicate that a particular human-readable reason should not be generated based on a particular user having particular user attributes. For example, a reason may reveal confidential or sensitive information about other users' navigations.

The machine learning engine updates the machine learning model based on the user feedback (Operation 326). For example, if a user indicates words as being in an incorrect order, the machine learning engine may adjust the attention engine to increase a probability of a particular word occurring in a particular position. If a user indicates one or more words as being omitted from the sequence, the machine learning engine may add one or more output vectors to the sequence. If the user indicates a word is unnecessary in the sequence, the machine learning engine may omit an output vector from the sequence. If a user indicates that a particular reason should not be generated, the machine learning model may refrain from generating a human-readable reason for a particular recommendation vector.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
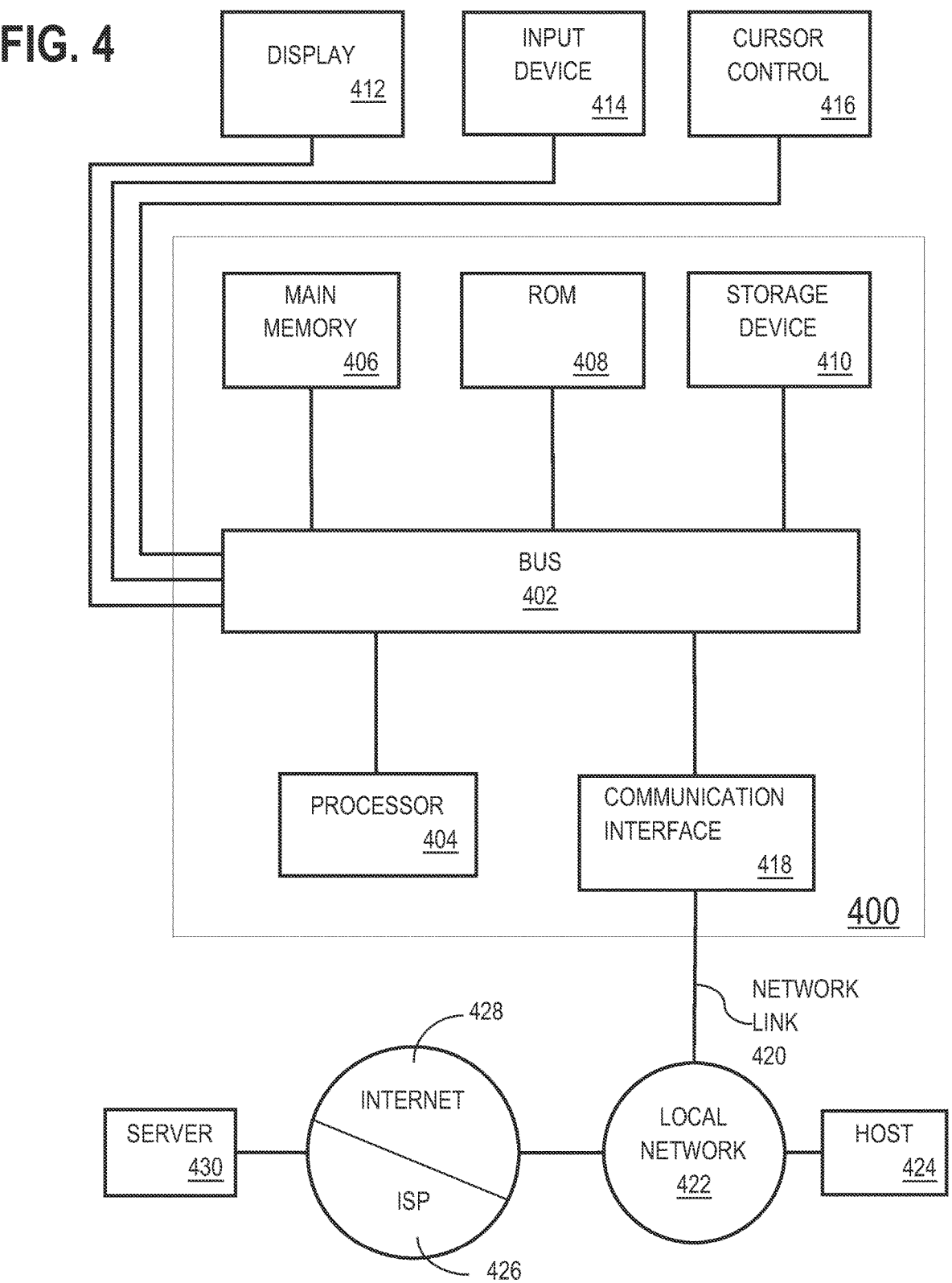
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions included in main memory 406. Such instructions may be read into main memory 406 from another storage medium, such as storage device 410. Execution of the sequences of instructions included in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    training a machine learning model to generate a human-readable reason for a target user interface navigational recommendation,
    wherein training the machine learning model comprises:
        obtaining a training data set of historical user interface navigation information, the training data set comprising:
            a first vector representing a particular user interface navigational recommendation; and
            a second vector representing a human-readable reason for the particular user interface navigational recommendation;
        based on the first vector, generating a sequence of output vectors representing an ordered sequence of words that make up a particular human-readable reason for the particular user interface navigational recommendation;
        wherein generating the sequence of output vectors comprises:
            generating a sequence of input vectors;
            providing each input vector of the sequence of input vectors to the machine learning model to generate a respective output vector of the sequence of output vectors;
        wherein a first input vector in the sequence of input vectors is generated based on first vector values of the first vector;
        wherein a subsequent input vector in the sequence of input vectors is generated based on (1) the first vector and (2) one or more previously-generated output vectors in the sequence of output vectors;
        training the machine learning model based on comparing the sequence of output vectors with the second vector representing the human-readable reason for the particular user interface navigational recommendation;
    applying the machine learning model to the target user interface navigational recommendation to generate the human-readable reason for the target user interface navigational recommendation.

2. The medium of claim 1, wherein the target user interface navigational recommendation includes a plurality of target user interface navigational recommendations; wherein the human-readable reason for the target user interface navigational recommendation includes a plurality of human-readable reasons for the plurality of target user interface navigational recommendations;
    wherein the instructions further cause:
        applying the plurality of target user interface navigational recommendations to the machine learning model to generate the plurality of human-readable reasons for the plurality of target user interface navigational recommendations;
        storing a plurality of sets of reason pairs, each set of reason pairs comprising:
            one target user interface navigational recommendation, among the plurality of user interface navigational recommendations; and
            one or more of the plurality of human-readable reasons for the one target user interface navigational recommendation.

3. The medium of claim 1, wherein generating the sequence of output vectors further comprises:
    for the first input vector in the sequence of input vectors:
        generating a first set of weighted values for a first plurality of vector values in the first vector; and
        generating the first input vector based on applying the first set of weighted values to the first vector;
    for a subsequent input vector in the sequence of input vectors:
        generating a second set of weighted values for the first vector values in the first vector; and
        applying the second set of weighted values to vector values of a previously-generated output vector in the sequence of output vectors to generate the subsequent input vector.

4. The medium of claim 1, wherein the first vector is a hidden layer of machine learning model for generating user interface navigational recommendations.

5. The medium of claim 1, wherein generating the sequence of output vectors further comprises:
    for the first input vector in the sequence of input vectors:
        generating a first set of one or more sequences of output vectors by:
            calculating a first plurality of probabilities for a corresponding first plurality of sequences of output vectors, the first plurality of probabilities specifying probabilities that the corresponding first plurality of sequences correspond to the input vector;
            selecting a first subset of the first plurality of sequences of output vectors as having the highest probabilities of corresponding to the input vector; and
            generating a first output vector in the sequence of output vectors based on the selected first subset of the first plurality of sequences of output vectors;
    for a subsequent input vector in the sequence of input vectors:
        generating a second set of one or more sequences of output vectors by:
            calculating a second plurality of probabilities for a corresponding second plurality of sequences of output vectors, the second plurality of probabilities specifying probabilities that the corresponding second plurality of sequences correspond to the subsequent input vector;
            selecting a second subset of the second plurality of sequences of output vectors as having the highest probabilities of corresponding to the subsequent input vector; and generating a subsequent output vector in the sequence of output vectors based on the selected second subset of the second plurality of sequences of output vectors.

6. The medium of claim 1, wherein the second vector is generated by applying a word-to-vector machine learning model to the human-readable reason for the user interface navigational recommendation associated with the first vector.

7. The medium of claim 1, wherein the second vector is generated by applying a word-to-vector machine learning model to the human-readable reason for the user interface navigational recommendation associated with the first vector;
wherein the first vector is a hidden layer of machine learning model for generating user interface navigational recommendations;
wherein the target user interface navigational recommendation includes a plurality of target user interface navigational recommendations;
wherein the human-readable reason for the target user interface navigational recommendation includes a plurality of human-readable reasons for the plurality of target user interface navigational recommendations;
wherein the instructions further cause:
applying the plurality of target user interface navigational recommendations to the machine learning model to generate the plurality of human-readable reasons for the plurality of target user interface navigational recommendations;
storing a plurality of sets of reason pairs, each set of reason pairs comprising:
one target user interface navigational recommendation, among the plurality of user interface navigational recommendations; and
one or more of the plurality of human-readable reasons for the one target user interface navigational recommendation;
wherein generating the sequence of output vectors further comprises:
for the first input vector in the sequence of input vectors:
generating a first set of weighted values for a first plurality of vector values in the first vector; and
generating the first input vector based on applying the first set of weighted values to the first vector;
for a subsequent input vector in the sequence of input vectors:
generating a second set of weighted values for the first vector values in the first vector; and
applying the second set of weighted values to vector values of a previously-generated output vector in the sequence of output vectors to generate the subsequent input vector;
wherein generating the sequence of output vectors further comprises:
for the first input vector in the sequence of input vectors:
generating a first set of one or more sequences of output vectors by:
calculating a first plurality of probabilities for a corresponding first plurality of sequences of output vectors, the first plurality of probabilities specifying probabilities that the corresponding first plurality of sequences correspond to the input vector;
selecting a first subset of the first plurality of sequences of output vectors as having the highest probabilities of corresponding to the input vector; and
generating a first output vector in the sequence of output vectors based on the selected first subset of the first plurality of sequences of output vectors;
for the subsequent input vector in the sequence of input vectors:
generating a second set of one or more sequences of output vectors by:
calculating a second plurality of probabilities for a corresponding second plurality of sequences of output vectors, the second plurality of probabilities specifying probabilities that the corresponding second plurality of sequences correspond to the subsequent input vector;
selecting a second subset of the second plurality of sequences of output vectors as having the highest probabilities of corresponding to the subsequent input vector; and
generating a subsequent output vector in the sequence of output vectors based on the selected second subset of the second plurality of sequences of output vectors.

8. A method, comprising:
training a machine learning model to generate a human-readable reason for a target user interface navigational recommendation,
wherein training the machine learning model comprises:
obtaining a training data set of historical user interface navigation information, the training data set comprising:
a first vector representing a particular user interface navigational recommendation; and
a second vector representing a human-readable reason for the particular user interface navigational recommendation;
based on the first vector, generating a sequence of output vectors representing an ordered sequence of words that make up a particular human-readable reason for the particular user interface navigational recommendation;
wherein generating the sequence of output vectors comprises:
generating a sequence of input vectors;
providing each input vector of the sequence of input vectors to the machine learning model to generate a respective output vector of the sequence of output vectors;
wherein a first input vector in the sequence of input vectors is generated based on first vector values of the first vector;
wherein a subsequent input vector in the sequence of input vectors is generated based on the first vector and one or more previously-generated output vectors in the sequence of output vectors;
training the machine learning model based on comparing the sequence of output vectors with the second vector representing the human-readable reason for the particular user interface navigational recommendation;
applying the machine learning model to the target user interface navigational recommendation to generate the human-readable reason for the target user interface navigational recommendation.

9. The method of claim 8, wherein the target user interface navigational recommendation includes a plurality of target user interface navigational recommendations;
wherein the human-readable reason for the target user interface navigational recommendation includes a plurality of human-readable reasons for the plurality of target user interface navigational recommendations;
wherein the instructions further cause:
applying the plurality of target user interface navigational recommendations to the machine learning model to generate the plurality of human-readable reasons for the plurality of target user interface navigational recommendations;
storing a plurality of sets of reason pairs, each set of reason pairs comprising:
one target user interface navigational recommendation, among the plurality of user interface navigational recommendations; and
one or more of the plurality of human-readable reasons for the one target user interface navigational recommendation.

10. The method of claim 8, wherein generating the sequence of output vectors further comprises:
for the first input vector in the sequence of input vectors:
generating a first set of weighted values for a first plurality of vector values in the first vector; and
generating the first input vector based on applying the first set of weighted values to the first vector;
for a subsequent input vector in the sequence of input vectors:
generating a second set of weighted values for the first vector values in the first vector; and
applying the second set of weighted values to vector values of a previously-generated output vector in the sequence of output vectors to generate the subsequent input vector.

11. The method of claim 8, wherein the first vector is a hidden layer of machine learning model for generating user interface navigational recommendations.

12. The method of claim 8, wherein generating the sequence of output vectors further comprises:
for the first input vector in the sequence of input vectors:
generating a first set of one or more sequences of output vectors by:
calculating a first plurality of probabilities for a corresponding first plurality of sequences of output vectors, the first plurality of probabilities specifying probabilities that the corresponding first plurality of sequences correspond to the input vector;
selecting a first subset of the first plurality of sequences of output vectors as having the highest probabilities of corresponding to the input vector; and
generating a first output vector in the sequence of output vectors based on the selected first subset of the first plurality of sequences of output vectors;
for a subsequent input vector in the sequence of input vectors:
generating a second set of one or more sequences of output vectors by:
calculating a second plurality of probabilities for a corresponding second plurality of sequences of output vectors, the second plurality of probabilities specifying probabilities that the corresponding second plurality of sequences correspond to the subsequent input vector;
selecting a second subset of the second plurality of sequences of output vectors as having the highest probabilities of corresponding to the subsequent input vector; and
generating a subsequent output vector in the sequence of output vectors based on the selected second subset of the second plurality of sequences of output vectors.

13. The method of claim 8, wherein the second vector is generated by applying a word-to-vector machine learning model to the human-readable reason for the user interface navigational recommendation associated with the first vector.

14. A system, comprising:
one or more processors; and
memory storing instructions that, when executed by the one or more processors, cause the system to perform:
training a machine learning model to generate a human-readable reason for a target user interface navigational recommendation,
wherein training the machine learning model comprises:
obtaining a training data set of historical user interface navigation information, the training data set comprising:
a first vector representing a particular user interface navigational recommendation; and
a second vector representing a human-readable reason for the particular user interface navigational recommendation;
based on the first vector, generating a sequence of output vectors representing an ordered sequence of words that make up a particular human-readable reason for the particular user interface navigational recommendation;
wherein generating the sequence of output vectors comprises:
generating a sequence of input vectors;
providing each input vector of the sequence of input vectors to the machine learning model to generate a respective output vector of the sequence of output vectors;
wherein a first input vector in the sequence of input vectors is generated based on first vector values of the first vector;
wherein a subsequent input vector in the sequence of input vectors is generated based on the first vector and one or more previously-generated output vectors in the sequence of output vectors;
training the machine learning model based on comparing the sequence of output vectors with the second vector representing the human-readable reason for the particular user interface navigational recommendation;
applying the machine learning model to the target user interface navigational recommendation to generate the human-readable reason for the target user interface navigational recommendation.

15. The system of claim 14, wherein the target user interface navigational recommendation includes a plurality of target user interface navigational recommendations;
wherein the human-readable reason for the target user interface navigational recommendation includes a plurality of human-readable reasons for the plurality of target user interface navigational recommendations;

wherein the instructions further cause:
applying the plurality of target user interface navigational recommendations to the machine learning model to generate the plurality of human-readable reasons for the plurality of target user interface navigational recommendations;
storing a plurality of sets of reason pairs, each set of reason pairs comprising:
one target user interface navigational recommendation, among the plurality of user interface navigational recommendations; and
one or more of the plurality of human-readable reasons for the one target user interface navigational recommendation.

16. The system of claim 14, wherein generating the sequence of output vectors further comprises:
for the first input vector in the sequence of input vectors:
generating a first set of weighted values for a first plurality of vector values in the first vector; and
generating the first input vector based on applying the first set of weighted values to the first vector;
for a subsequent input vector in the sequence of input vectors:
generating a second set of weighted values for the first vector values in the first vector; and
applying the second set of weighted values to vector values of a previously-generated output vector in the sequence of output vectors to generate the subsequent input vector.

17. The system of claim 14, wherein the first vector is a hidden layer of machine learning model for generating user interface navigational recommendations.

18. The system of claim 14, wherein generating the sequence of output vectors further comprises:
for the first input vector in the sequence of input vectors:
generating a first set of one or more sequences of output vectors by:
calculating a first plurality of probabilities for a corresponding first plurality of sequences of output vectors, the first plurality of probabilities specifying probabilities that the corresponding first plurality of sequences correspond to the input vector;
selecting a first subset of the first plurality of sequences of output vectors as having the highest probabilities of corresponding to the input vector; and
generating a first output vector in the sequence of output vectors based on the selected first subset of the first plurality of sequences of output vectors;
for a subsequent input vector in the sequence of input vectors:
generating a second set of one or more sequences of output vectors by:
calculating a second plurality of probabilities for a corresponding second plurality of sequences of output vectors, the second plurality of probabilities specifying probabilities that the corresponding second plurality of sequences correspond to the subsequent input vector;
selecting a second subset of the second plurality of sequences of output vectors as having the highest probabilities of corresponding to the subsequent input vector; and
generating a subsequent output vector in the sequence of output vectors based on the selected second subset of the second plurality of sequences of output vectors.

19. The system of claim 14, wherein the second vector is generated by applying a word-to-vector machine learning model to the human-readable reason for the user interface navigational recommendation associated with the first vector.

* * * * *